United States Patent
Sollami

(10) Patent No.: US 6,390,352 B1
(45) Date of Patent: *May 21, 2002

(54) METHOD FOR BONDING A TUBULAR PART IN COAXIAL RELATIONSHIP WITH A PART HAVING A BORE THEREIN

(75) Inventor: Phillip A. Sollami, Herrin, IL (US)

(73) Assignee: The Sollami Company, Herrin, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 09/888,216

(22) Filed: Jun. 22, 2001

Related U.S. Application Data

(63) Continuation-in-part of application No. 09/490,103, filed on Jan. 24, 2000, now Pat. No. 6,250,535.

(51) Int. Cl.[7] .............................................. B21D 39/04
(52) U.S. Cl. ...................... 228/132; 228/125; 228/174
(58) Field of Search ............................... 228/132, 125, 228/171, 174, 135; 403/30, 270

(56) References Cited

U.S. PATENT DOCUMENTS

| | | | | |
|---|---|---|---|---|
| 3,666,302 A | * | 5/1972 | Kellet |
| 4,659,245 A | * | 4/1987 | Hirao et al. |
| 5,076,484 A | * | 12/1991 | Ito et al. |
| 5,098,233 A | * | 3/1992 | Patterson et al. |
| 6,250,535 B1 | * | 6/2001 | Sollami |

* cited by examiner

Primary Examiner—M. Alexandra Elve
Assistant Examiner—Jonathan Johnson
(74) Attorney, Agent, or Firm—Robert L. Marsh

(57) ABSTRACT

A tubular part is brazed into coaxial relationship with the bore in a metal body part having a counterbore for receiving the tubular part. In a first embodiment a tubular sleeve is fitted within the bores of the metal body and the tubular part. The parts are then heated and vibrated while the braze material is melted. In a second embodiment a frustoconical plug is inserted into the coaxial bores of the parts and the parts are again heated and vibrated. The parts are allowed to cool until the braze material hardens, after which the vibration is terminated. The remaining sleeve or plug is then machined out of the two bores leaving the tubular part brazed to the metal body.

17 Claims, 4 Drawing Sheets

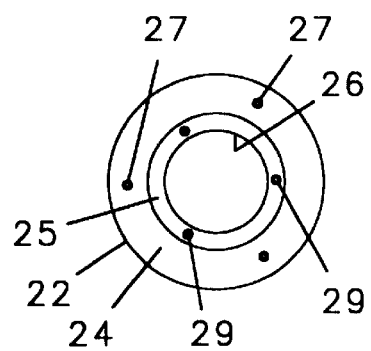
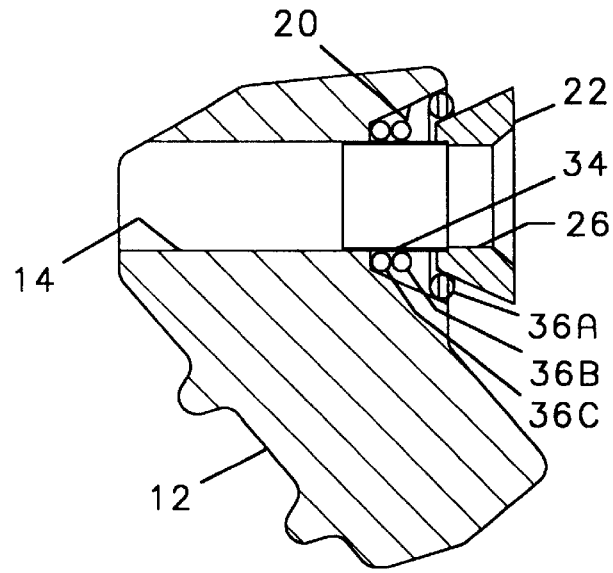
FIG.3　　　FIG.4
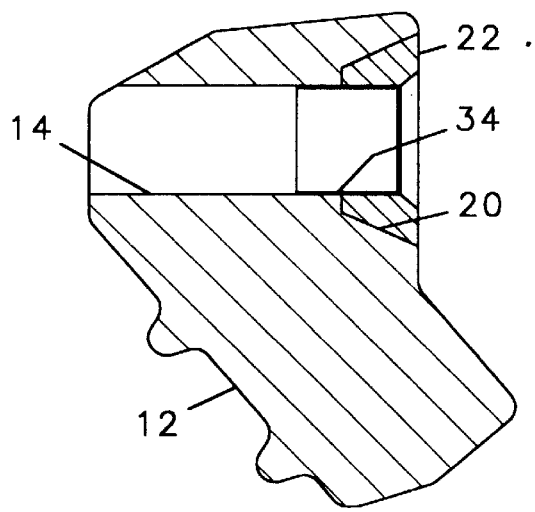
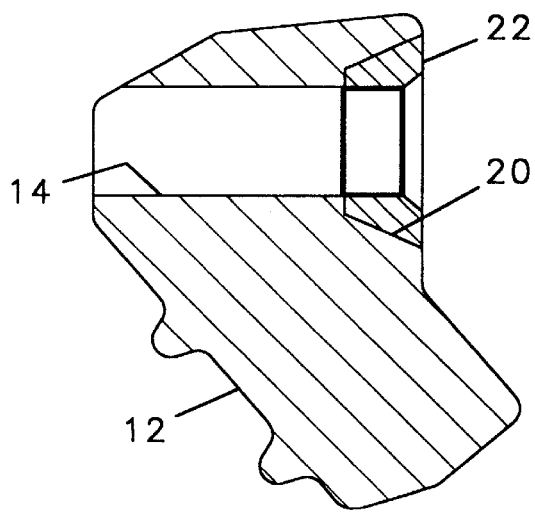
FIG.5　　　FIG.6

METHOD FOR BONDING A TUBULAR PART IN COAXIAL RELATIONSHIP WITH A PART HAVING A BORE THEREIN

This is a continuation-in-part of my application filed Jan. 24, 2000 and assigned Ser. No. 09/490,103 now U.S. Pat. No. 6,250,535. The present invention relates to an improved method for brazing a tubular part in coaxial relationship with the bore of another part and in particular to brazing a tungsten carbide wear ring into the countersink surrounding a bore in a metal part.

BACKGROUND OF THE INVENTION

Where a cylindrical member rotates within a complementary cylindrical bore, the useful life of the parts can be extended by providing a hardened wear ring between the parts. For example, machines used to cut hard surfaces such as concrete and asphalt have a rotatable cutting wheel with a plurality of cutting tools mounted on the wheel which are moved against a hard surface to advance the cut. Each of the cutting tools has a cylindrical shank which is rotatably mounted in a complementary cylindrical aperture in a tool holder. As disclosed in my co-pending application, Ser. No. 09/121,726 filed Jul. 24, 1998, now U.S. Pat. No. 6,164,728 the useful life of a tool and the tool holder can be extended by providing a tungsten carbide tubular wear ring at the forward end of the aperture in the tool holder.

It is customary to use a braze to retain such parts, such as a tungsten carbide tubular wear ring fitted in a countersink at the end of a cylindrical aperture. The brazing process consists of providing a plurality of rings of braze material which are fitted between the inner surface of the countersink and the outer surface of tubular sleeve. The rings of braze material prevent the hardened ring from becoming seated within the countersink until the braze material is heated and melts, after which the ring can be urged into the countersink until it has become seated. After the parts cool, a substantial portion of the braze material should remain between the inner surface of the countersink and the outer surface of the wear ring to retain the parts in the assembled relationship.

I have found, however, that when the braze material melts and a tungsten carbide wear ring is urged into a countersink as described above, most of the liquefied braze material flows into the cylindrical bore leaving an insufficient amount of braze material to retain the parts in the assembled relationship. When a tungsten carbide insert is brazed into a countersink around the bore in a tool holder, as described above, it has been found that the braze will fail when the tool is subjected to the forces required to cut hard material such as concrete or asphalt. An improved method is therefore needed for brazing a tungsten carbide tubular part in nested relationship with a countersink in a metal part.

SUMMARY OF THE INVENTION

Briefly, the present invention is embodied in a method of assembling a tungsten carbide tubular part in coaxial relationship with the bore of another part where the end of the tubular part nests into the second part.

In accordance with the present invention, to braze a tungsten carbide tubular part into a countersink in a metal body having a coaxial bore therein, a plurality of rings of braze material are needed. The rings of brazing material have an inner diameter at least equal to the inner diameter of the tungsten carbide tubular part and an outer diameter which is less than the inner diameter of the countersink. The parts are arranged in coaxial relationship with the rings of braze material and a viscous flux positioned between the complementarily shaped surfaces of the parts to be bonded together.

In a first embodiment of the invention a compressible tubular sleeve (such as a split ring) made of a soft material having an outer diameter which is a little larger than the inner diameter of the cylindrical bore in the metal body is press fitted into the bore of the metal body. The rings of braze material are fitted over the compressible sleeve, then the tungsten carbide wear ring is fitted around the compressible sleeve and against the rings of braze material. The flux is applied to facilitate the brazing process. The assembled parts are thereafter heated, preferably by induction using a channel type coil, causing the braze material to melt. After the braze material has melted the tubular part is urged into nested relationship in the metal body. The parts are orientated so that gravity will urge the parts together and the braze material is retained between the parts by the tubular sleeve of soft metal between the tungsten carbide tubular part and the metal body.

As the braze material melts, the parts are vibrated at about 2500 cycles per minute to agitate the braze material so that heat is evenly distributed throughout and to properly seat the tungsten carbide wear ring with respect to the countersink in the metal body.

The vibration of the parts continues until the parts exit the channel coil, which is typically about six feet long. The parts are allowed to cool until the braze material hardens, after which all the parts will be bonded together. Thereafter, the soft metal of the tubular sleeve can be removed in a machining process. Following the removal of the tubular sleeve, the metal body and the tungsten carbide tubular part will be retained together by the braze remaining between them.

In a second embodiment of the invention, a solid tapered plug made of soft metal is inserted into the bore of the metal body and the bore of the tubular member. The taper of the outer wall of the plug is very gradual and the maximum outer diameter thereof is less than that of the inner diameter of the bore of the tubular member such that when it is inserted into the bore of the metal body it will bind against the inner wall of the bore at the base of the countersink. As with the first embodiment, the parts are heated until the braze material melts and then are vibrated until the assembly exits the channel coils. The parts are then allowed to cool until the braze material hardens, after which the metal plug can be machined out.

BRIEF DESCRIPTION OF THE DRAWINGS

A better understanding of the present invention will be had after a reading of the following detailed description taken in conjunction with the drawings where;

FIG. 3 is a rear end view of the wear ring shown in FIG. 2;

FIG. 4 is a cross-sectional view of the parts shown in FIG. 2, assembled prior to the melting of the braze material;

FIG. 5 is a cross-sectional view of the parts shown in FIG. 2 after the braze material has been melted and the parts seated;

FIG. 6 is a cross sectional view of the parts shown in FIG. 2 after the central sleeve has been machined out of the bore of the tool holder;

DETAILED DESCRIPTION OF THE PREFERRED EMBODIMENTS

Figure 1:
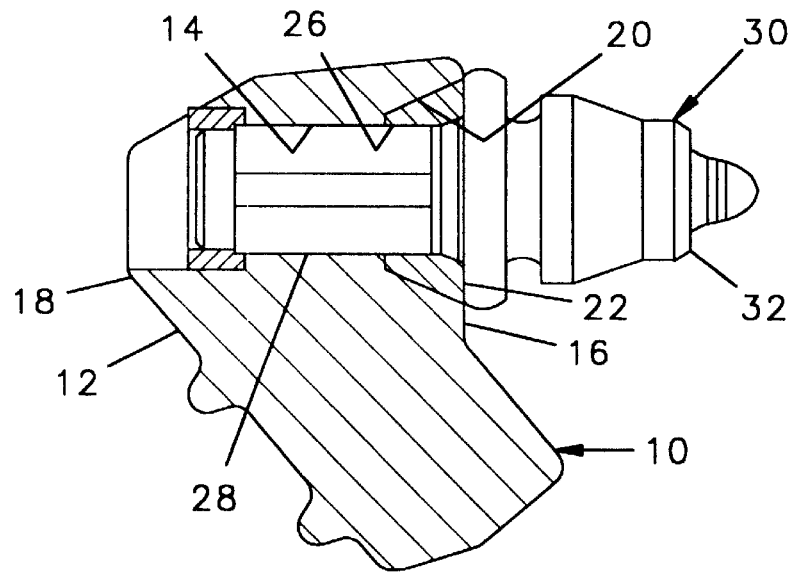
FIG. 1 is a cross sectional view of a tool holder having a cylindrical bore and a hardened metal wear ring into which a rotatable tool has been fitted.

Referring to FIGS. 1 and 3, a machine used to cut hardened material such as concrete has a plurality of tool holders 10 fitted around the circumference of a wheel, not shown. Each tool holder 10 has a body 12 with a cylindrical bore 14 extending from a forward surface 16 to a rear surface 18. Fitted within a countersink 20 at the forward end of the bore 14 is a tubular tungsten carbide wear ring 22 having a rear surface 25, an outer surface 24 complementary in shape to the inner surface of the countersink 20 and a cylindrical bore 26 equal to or a little larger than the diameter of bore 14. To provide room for braze material between the outer surface 24 of the tungsten carbide wear ring 22 and the inner surface of the countersink 20 a plurality of bumps 27 are spaced around the outer surface 24 of the wear ring 22. Similarly, to space the rear surface 25 from the bottom surface 31 of the countersink 20, a second plurality of bumps 29 are spaced around the rear surface 25 of the wear ring 22.

Fitted into the coaxial bores 14, 26 of the body 12 and the wear ring 22 is a cylindrical mounting portion 28 of a tool 30 having a tapered forward cutting end 32. The wear ring 22 prevents the forward surface 16 of the of the body 12 from becoming worn and prevents the cylindrical bore 14 from becoming enlarged as the tool 30 is forced against a hard surface such as concrete or asphalt, however the wear ring 22 will become dislodged from the countersink 20 unless it is adequately retained by braze material between the parts.

Referring to FIGS. 2 to 6, in accordance with the present invention, to retain the wear ring 22 within the countersink 20 of the body 12 a split ring sleeve 34 of soft steel is provided having an outer diameter sized to fit snugly within the bore 14 of the body 12 and loosely through the bore 26 of the wear ring 22. A viscous flux which facilitates the brazing is applied to the parts before they are assembled. A plurality of rings of brazing material 36a–36c, each having a inner diameter larger than the inner diameter of the bore 14 and an outer diameter which is less than the inner diameter of the countersink 20, are fitting around the split ring 34 between the body 12 and the tungsten carbide wear ring 22 as shown in FIG. 4. Thereafter, the parts are subjected to heat until the braze ring 36 melts.

Figure 2:
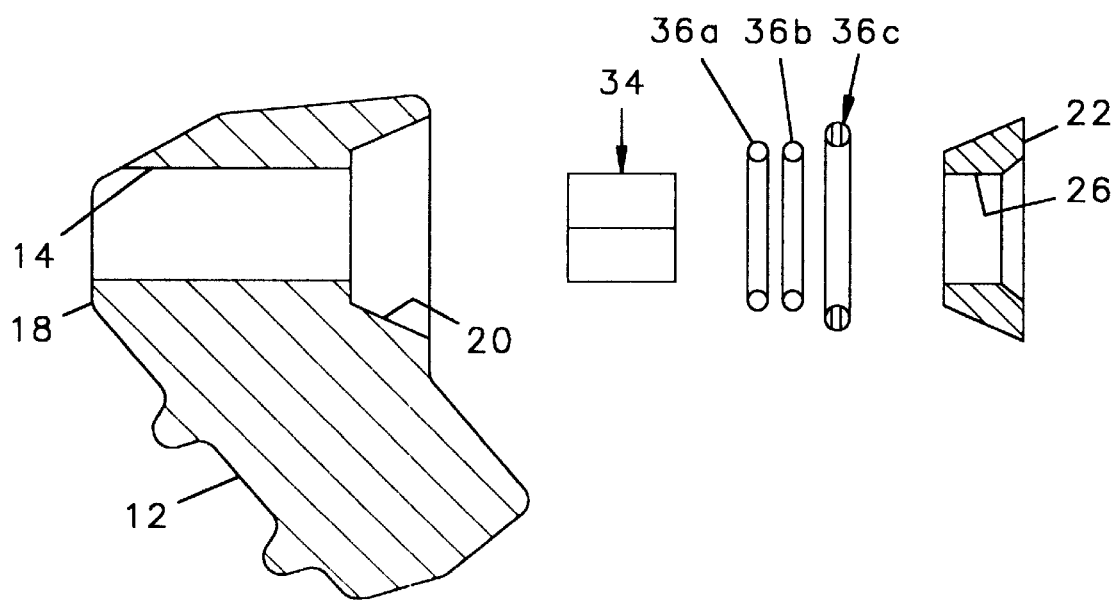
FIG. 2 is an exploded view of the parts needed to braze a wear ring into the countersink surrounding the bore in the tool holder in accordance with a first embodiment of the invention.
Figure 7:
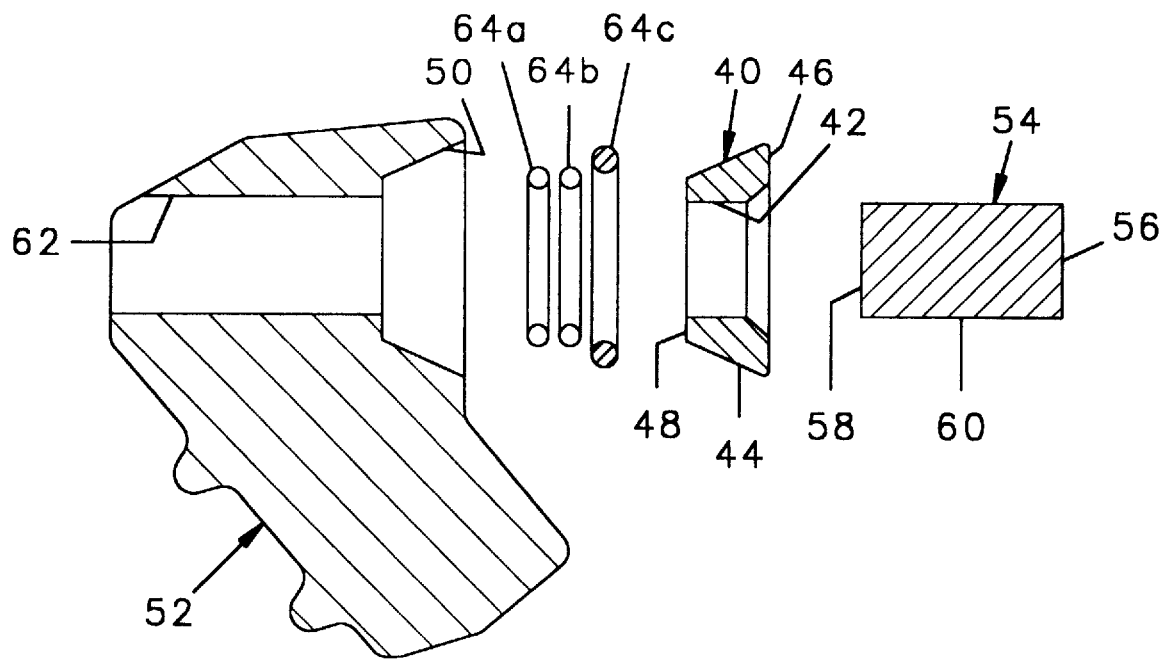
FIG. 7 is an exploded cross-sectional view of the parts needed to braze the wear ring into the countersink surrounding the bore in accordance with a second embodiment of the invention.

The parts are orientated with the counter sink extending downward as indicated by the arrow in FIG. 2 and the vibration of the parts continues as the braze rings 36a–36c melt causing the wear ring 22 to be urged by gravity into the countersink 20. Preferably the parts are vibrated at the rate of about 2500 cycles per minute. The parts are heated in a channel type coil, not shown, by subjecting them to a high amperage at a frequency of about ten kilohertz. Heat is first generated within the body 12, then in the braze material 36 and finally in the wear ring 22 as the parts move through the coil. The wear ring heats up more slowly than any of the other parts because only the cobalt in the tungsten carbide is magnetic and therefor the wear ring does not reach a high enough temperature to be bonded by the braze material until after the braze material becomes liquefied. The temperature differences caused by the slowly heating tungsten carbide can, therefor, reduce the effectiveness of the braze. Vibration of the parts agitates the liquid braze material and assists in distributing the heat.

Vibration also assists in the seating of the parts. In the preferred embodiment the parts are vibrated until they exit the channel coil, after which the parts are allowed to cool. Once the braze material hardens, the parts appear in cross-section as shown in FIG. 5.

After the parts are allowed to cool, hardened braze material will extend between the inner surfaces of all the parts and, in particular, a substantial portion of the braze material will remain between the outer surface 24 of the wear ring 22 and the inner surface of the countersink 20. Thereafter the split ring 34 and any braze material adhering to the split ring 34 can be machined away leaving the parts as shown in FIG. 6. When the parts are assembled as described above enough liquid braze material will be retained between the surfaces of the countersink 20 and the tungsten carbide wear ring 22 to adequately retain the parts while the tool 30 is being used to cut a hardened surface, not shown.

It is recommended that the diameter of the bore 26 of the tungsten carbide wear ring 22 be slightly larger than the diameter of the bore 14 of the tool holder so that the wear ring will not be contacted by the boring tool during the boring operation. The tungsten carbide of the wear ring 22 is extremely brittle and is easily chipped or otherwise damaged by the boring tool during the boring operation. Conversely, the cutting tip of the bore tool is also made of tungsten carbide which can likewise become damaged if it contacts the bore of the tungsten carbide wear ring. By providing a bore 26 with a diameter which is a little larger than that of the tool holder 12, neither piece of tungsten carbide will become chipped while the split ring 34 is being machined away.

It should be appreciated that the invention is usable to facilitate the brazing of many metals and even nonmetal materials, and whereas it is desirable that the bore of a tungsten carbide wear ring be a little larger than the diameter of the adjacent bore, a different relationship between the dimensions of the parts may be desirable where different materials are involved.

It should be appreciated that the method of the present invention can be used to assemble any two parts which are to be retained in nested relationship with a coaxial bore of equal diameter extending between them. Specially, the method can be used to retain any two parts together where the parts having cylindrical bores of equal or nearly equal diameter and having complementary surfaces which fit together in nested relationship with bores thereof aligned in axial relationship to each other.

Referring to FIGS. 7 to 10, in which another method in which a tungsten carbide wear ring 40 having a cylindrical bore 42, a frustoconical outer surface 44 and an annular forward and rear surfaces 46, 48 respectively may be brazed into a countersink 50 in the forward end of a tool holder 52 is depicted. In accordance with this embodiment, a tapered plug 54 having a circular forward surface 56, a circular rearward surface 58 and a frustoconical outer surface 60 is positioned through the bores 42, 62 of the tool holder 52 and the wear ring 40.

Figure 8:
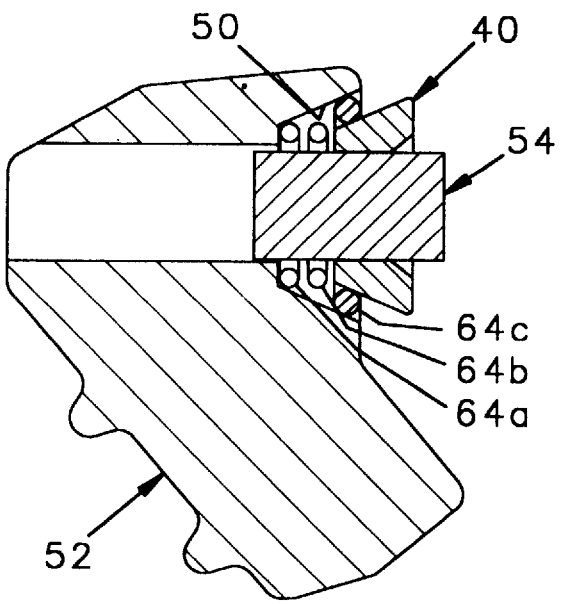
FIG. 8 is a cross-sectional view of the tool holder shown in FIG. 7 prior to subjection the parts to heat.

The diameter of the forward surface 56 is a little greater than the diameter of the bore 62 in the tool holder 52 and the diameter of the rearward surface 58 is a little less than that of the bore 62 so that the frustoconical outer surface 60 will become wedged in the bore 62 when the smaller rearward end of the plug 54 is inserted into the bore 62. Preferably the inner diameter of the bore 42 of the wear ring 40 is a little greater than that of the bore 62 of the tool holder 52 and greater than the diameter of the larger forward surface 56 of the plug 54 so that it can be fitted over the end of the plug 54 when the parts are assembled together. The rate of incline of the frustoconical surface 60 of the plug 54 is sufficiently gradual to allow the frustoconical surface 60 to bind only against the bore 62 of the tool holder 52 when the parts are assembled together as shown in FIG. 8. The soft metal of the plug 54 will also deform as it is forced into the bore 62, and the deformed metal will form a seal which prevents leakage of liquid braze material into the bore 62. The parts are assembled by first press fitting the small rear end 58 of the plug 54 into the bore 62 of the tool holder 52. Thereafter a viscous flux, not shown, is applied to the parts after which the rings 64a–64c of braze material are assembled over the larger forward end 56 of the plug 54.

It is desirable that the central openings of the rings 64a–64c of braze material and the diameter of the bore 42 of the wear ring 40 be sufficiently larger to allow these parts to fit over the larger diameter forward surface 56 of the plug 54 so that they can be easily assembled into the configuration shown in FIG. 8. The parts are oriented as shown by the arrow in FIG. 8 so that gravity will draw the tungsten carbide wear ring 40 downward to seat in the countersink 50. While the parts are being heated they are also subjected to vibration as was done in the first embodiment. The vibration and the force of gravity then urge the parts together as the braze melts until they reach the configuration shown in FIG. 9. As described above, the vibration of the parts assists in the distribution of heat and in seating the parts.

Figure 9:
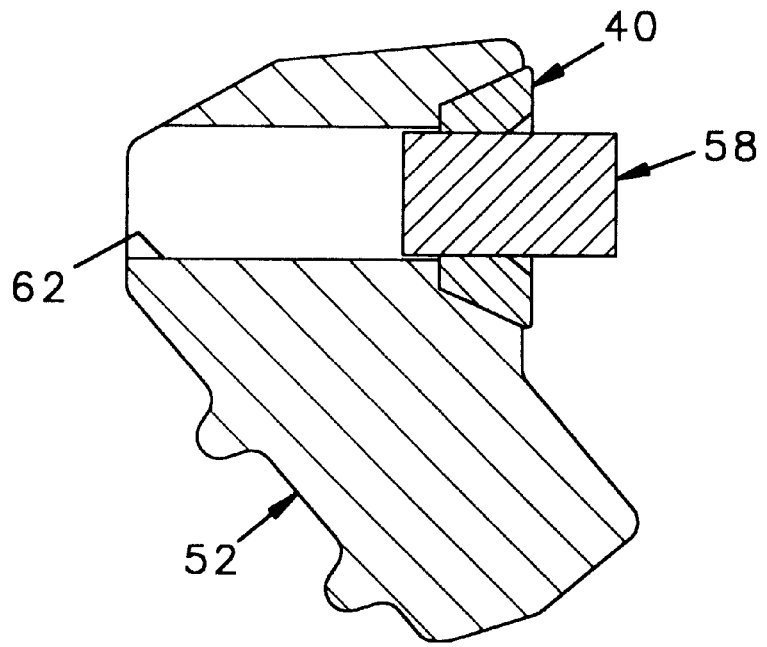
FIG. 9 is across-sectional view of the tool holder shown in FIG. 7 prior to the machining out of the plug.
Figure 10:
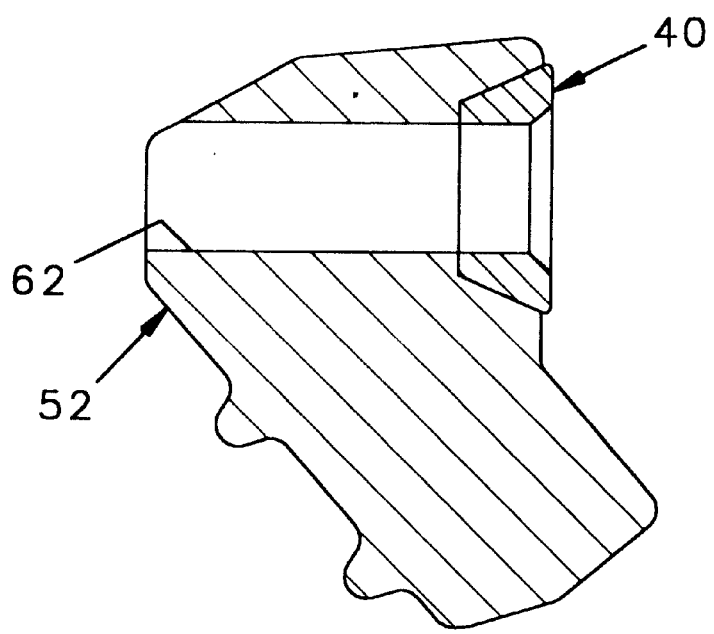
FIG. 10 is a cross-sectional view of the tool body shown in FIG. 7 after the plug has been removed.

Once the parts leave the channel coil they are in the relationship shown in FIG. 9. They are then allowed to cool. After the parts cool sufficiently for the braze material to harden the plug 54 can be machined out from the bore 62. After the plug is machined away the wear ring 40 will be brazed into the countersink 50 as shown in FIG. 10.

While the invention has been described with respect to two embodiments, it will be appreciated that many modifications and variations may be made without departing from the true spirit and scope of the invention. It is therefore the intent of the appendent claims to cover such modifications and variations which fall within the true spirit and scope of the invention.

What is claimed:

1. The method of brazing a tubular part having a cylindrical outer surface, an annular end surface and a cylindrical bore into a countersink around a bore in a metal body where said countersink has an inner surface complementary in shape to said outer surface and said annular end surface, and said bore in said metal body has a diameter equal or nearly equal to a diameter of said cylindrical bore in said tubular part, said method comprising the steps of providing a ring of braze material where said ring of braze material has an inner diameter at least equal to said cylindrical bore and an outer diameter which is not greater than the diameter of said inner surface of said countersink, providing a tubular sleeve having an outer diameter sized to fit snugly within said bore of said metal body, positioning said tubular sleeve within both said cylindrical bore of said tubular part and said bore in a metal body, positioning said ring of braze material over said tubular sleeve and within said countersink, positioning said tungsten carbide tubular part around said tubular sleeve and against said ring of braze material, heating said parts until said ring of braze material melts, seating said annular end surface of said tubular part against said inner surface of said countersink, allowing said braze material to cool and harden, and machining said tubular sleeve out of said bore in said metal body and said cylindrical bore of said tubular part.

2. The method of claim 1 and further comprising the step of vibrating the parts while said braze material in melted.

3. The method of claim 2 where said tubular sleeve is a split ring.

4. The method of claim 2 where said tubular sleeve is made of a soft metal.

5. The method of claim 2 where said tubular sleeve is made with a collapsible wall.

6. The method of brazing a tungsten carbide tubular part having an outer surface with an annular end surface against a metal body having a bore and a countersink complementary in shape to said outer surface and said annular end surface of said tubular part, where said bore in said metal body is substantially equal to or nearly equal in diameter to said cylindrical bore in said tubular part, said annular end surface engaging said countersink in nested relationship, said method comprising the steps of providing a ring of braze material where said ring of braze material has an inner diameter at least equal to said cylindrical bore and an outer diameter which is not greater than an outer diameter of said tubular part, providing a tubular sleeve having an outer diameter sized to fit snugly within said bore of said metal body, positioning said tubular sleeve within said cylindrical bore of said metal body, positioning said ring of braze material around said tubular sleeve and against said countersink, positioning said tungsten carbide tubular part around said tubular sleeve and against said ring of braze material, heating said parts until said ring of braze material melts, seating said annular end surface of said tubular part against said complementarily shaped surface of said countersink, allowing said braze material to cool and harden, and machining said tubular sleeve out of said bore in a metal body and said cylindrical bore.

7. The method of claim 6 and comprising the further step of vibrating said parts while said braze material is melted.

8. The method of claim 7 where said tubular sleeve is a compressible split ring.

9. The method of claim 7 where said tubular sleeve is made of soft metal.

10. The method of claim 7 where said tubular sleeve is made with a collapsible wall.

11. The method of brazing a tungsten carbide tubular part having a cylindrical outer surface, an annular end surface and a cylindrical bore into a countersink around a bore in a metal body where said countersink has an inner surface complementary in shape to said outer surface and said annular end surface, and said bore in said metal body has a diameter equal or nearly equal to a diameter of said cylindrical bore in said tubular part, said method comprising the steps of providing a ring of braze material where said ring of braze material has an inner diameter at least equal to said cylindrical bore and an outer diameter which is not greater than the diameter of said inner surface of said countersink, providing a frustoconical plug having a first end with a diameter a little larger than said diameter of said bore in said cylindrical part and a second end with a diameter a little smaller than said diameter of said bore in said cylindrical part, positioning said second end of said plug into said bore of said in said metal body, positioning said ring of braze material over said plug and within said countersink, positioning said tungsten carbide tubular part over said plug and against said ring of braze material, heating said parts until said ring of braze material melts, seating said annular end surface of said tubular part against said inner surface of said countersink, allowing said braze material to cool and harden, and machining said frustoconical plug out of said bore in said metal body and said cylindrical bore of said tubular part.

12. The method of claim 11 and further comprising the step of vibrating the parts while said braze material in melted.

13. The method of claim 12 where said plug is made of a soft metal.

14. The method of claim 12 where said tubular sleeve is made with a collapsible wall.

15. The method of brazing a tungsten carbide tubular part having an outer surface with an annular end surface against a metal body having a bore and a countersink complementary in shape to said outer surface and said annular end surface of said tungsten carbide tubular part, where said bore in said metal body is substantially equal to or nearly equal in diameter to said cylindrical bore in said tubular part, said annular end surface engaging said countersink in nested relationship, said method comprising the steps of providing a ring of braze material where said ring of braze material has an inner diameter at least equal to said cylindrical bore and an outer diameter which is not greater than an outer diameter of said tubular part, providing a frustoconical plug having a first end with a diameter a little larger than said bore of said metal body and a second end having a diameter a little smaller than said bore of said metal body, positioning said second end of said frustoconical plug into said bore of said metal body, positioning said ring of braze material around said frustoconical plug and against said countersink, heating said parts until said ring of braze material melts, seating said annular end surface of said tubular part against said complementarily shaped surface of said countersink, allowing said braze material to cool and harden, and machining said frustoconical plug out of said bore in a metal body and said cylindrical bore of said tubular part.

16. The method of claim 15 and comprising the further step of vibrating said parts while said braze material is melted.

17. The method of claim 16 where said frustoconical plug is made of soft metal.

* * * * *